(12) United States Patent
Smith et al.

(10) Patent No.: US 12,077,310 B1
(45) Date of Patent: Sep. 3, 2024

(54) AIRCRAFT PROPULSION SYSTEM WITH TURBINE ENGINE AND EXHAUST CONDENSER

(71) Applicant: Pratt & Whitney Canada Corp., Longueuil (CA)

(72) Inventors: Scott Smith, St-Lambert (CA); Russell Stratton, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/211,125

(22) Filed: Jun. 16, 2023

(51) Int. Cl.
*B64D 33/04* (2006.01)
*F01D 25/32* (2006.01)
*F02K 1/82* (2006.01)

(52) U.S. Cl.
CPC ............ *B64D 33/04* (2013.01); *F01D 25/32* (2013.01); *F02K 1/822* (2013.01); *F05D 2220/323* (2013.01)

(58) Field of Classification Search
CPC .......... B64D 33/04; F02K 1/822; F01D 25/32
See application file for complete search history.

(56) References Cited

U.S. PATENT DOCUMENTS

| | | | |
|---|---|---|---|
| 6,951,110 B2 * | 10/2005 | Kang | F28D 9/0018 165/4 |
| 7,086,239 B2 | 8/2006 | Haas | |
| 11,603,798 B1 | 3/2023 | Terwilliger | |
| 2005/0235627 A1 * | 10/2005 | Vandermolen | F02C 7/08 60/39.511 |
| 2014/0251585 A1 | 9/2014 | Kusuda | |

\* cited by examiner

*Primary Examiner* — Andrew H Nguyen
(74) *Attorney, Agent, or Firm* — Getz Balich LLC

(57) ABSTRACT

An aircraft propulsion system is provided that includes a turbine engine and an exhaust gas condenser. The exhaust gas condenser includes a housing, a nozzle, inlet and outlet air scoops, and an exhaust gas conduit bank. The housing has an interior cavity, top and bottom sides, and first and second lateral sides. The exhaust gas conduit bank is disposed in the interior cavity of the housing. The exhaust gas conduit bank includes a plurality of exhaust gas conduits and bypass air passages that are disposed in an alternating configuration. The exhaust gas conduits extend axially between the forward and aft ends, are open at the forward end and at the nozzle. The bypass air passages receive bypass air from the inlet air scoop and direct the bypass air laterally across the condenser to the outlet air scoop.

20 Claims, 6 Drawing Sheets

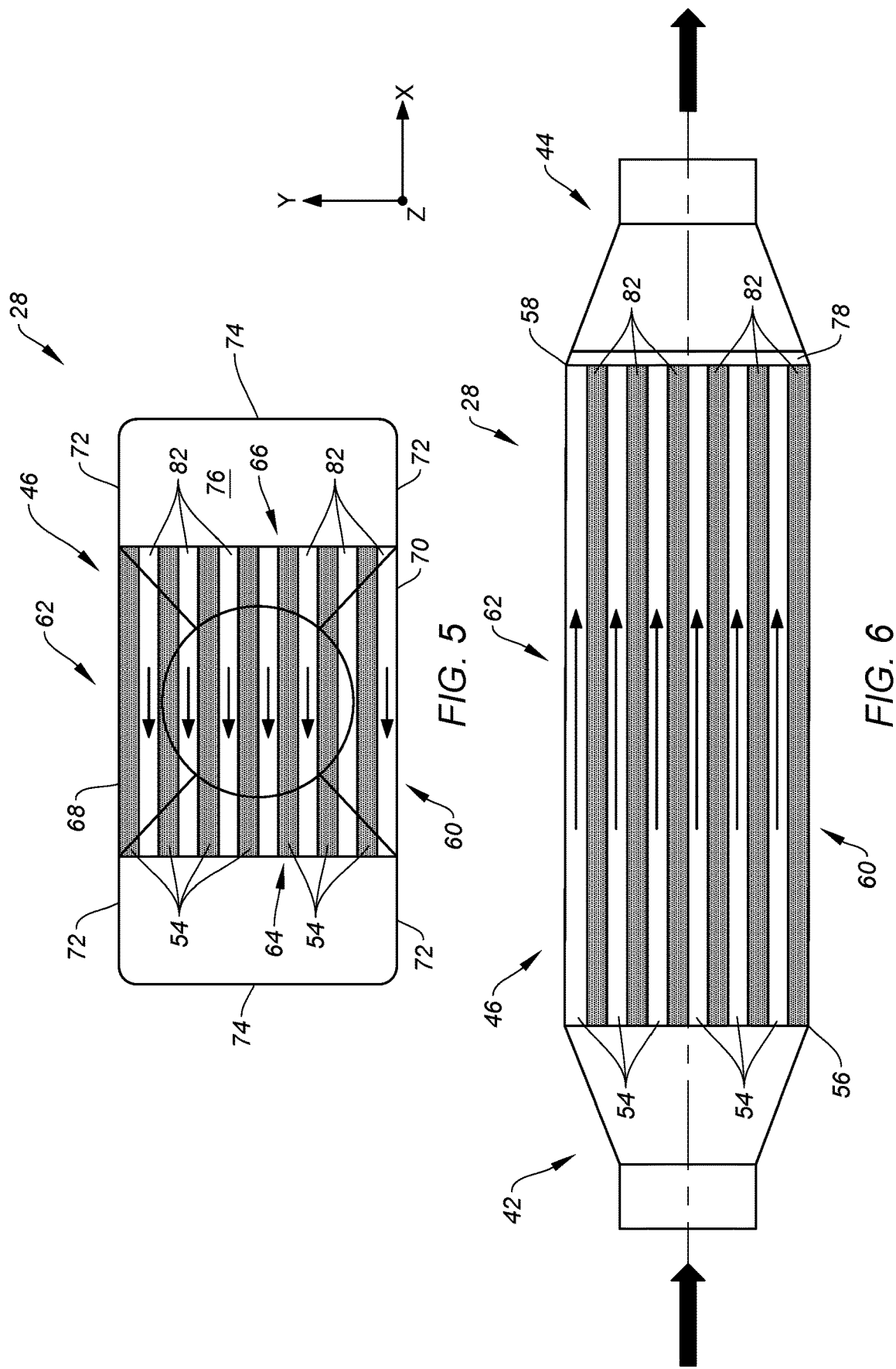

AIRCRAFT PROPULSION SYSTEM WITH TURBINE ENGINE AND EXHAUST CONDENSER

BACKGROUND OF THE INVENTION

1. Technical Field

This disclosure relates to an aircraft in general, and to a turbine engine system for an aircraft in particular.

2. Background Information

There is interest in alternative fuels for gas turbine engines. There is interest, for example, in fueling a gas turbine engine with a non-hydrocarbon fuel (e.g., hydrogen) rather than a traditional hydrocarbon fuel such as kerosine to reduce greenhouse emissions. Various systems and methods are known in the art for fueling a gas turbine engine with hydrogen. While these known systems and methods have various advantages, there is still room in the art for improvement.

SUMMARY

According to an aspect of the present disclosure, an aircraft propulsion system is provided that includes a turbine engine and an exhaust gas condenser. The turbine engine is configured to exhaust gases during combustion that may contain water vapor. The exhaust gas condenser extends lengthwise along a central axis and includes a housing, a nozzle, an inlet air scoop, an outlet air scoop, and an exhaust gas conduit bank. The housing extends lengthwise between forward and aft ends, and has an interior cavity, top and bottom sides, and first and second lateral sides. The top side is opposite the bottom side, and the first and second lateral sides are opposite one another. The first and second lateral sides extend between the top and bottom sides. The nozzle is in communication with the housing and is disposed at the aft end. The inlet air scoop is attached to the second lateral side of the housing. The outlet air scoop is attached to the first lateral side of the housing. The exhaust gas conduit bank is disposed in the interior cavity of the housing. The exhaust gas conduit bank includes a plurality of exhaust gas conduits and a plurality of bypass air passages. The exhaust gas conduits and the bypass air passages are disposed relative to one another in an alternating configuration. The exhaust gas conduits extend axially between the forward and aft ends, are open at the forward end to receive the exhaust gases from the turbine engine, and are open at the nozzle. The bypass air passages are configured to receive bypass air from the inlet air scoop and direct the bypass air between the exhaust gas conduits, laterally across the condenser to the outlet air scoop.

In any of the aspects or embodiments described above and herein, the exhaust gas condenser may be configured to keep the exhaust gases separate from the bypass air.

In any of the aspects or embodiments described above and herein, the housing has a length, a width, and a height, and the inlet air scoop may have an opening disposed proximate to the forward end, and the inlet air scoop may taper inwardly toward the central axis in a direction from the forward end to the aft end.

In any of the aspects or embodiments described above and herein, the inlet air scoop may extend the length of the housing.

In any of the aspects or embodiments described above and herein, the inlet air scoop may extend the height of the housing.

In any of the aspects or embodiments described above and herein, the inlet air scoop may have a flow area that decreases in a direction from the forward end to the aft end.

In any of the aspects or embodiments described above and herein, the housing has a length, a width, and a height, and the outlet air scoop may have an opening disposed proximate to the aft end, and the outlet air scoop may taper outwardly away from the central axis in a direction from the forward end to the aft end.

In any of the aspects or embodiments described above and herein, the outlet air scoop may extend the length of the housing.

In any of the aspects or embodiments described above and herein, the outlet air scoop may extend the height of the housing.

In any of the aspects or embodiments described above and herein, the outlet air scoop may have a flow area that increases in a direction from the forward end to the aft end.

In any of the aspects or embodiments described above and herein, one or more of the exhaust gas conduits may include a plurality of first heat transfer features that extend into a first flow path defined by the respective exhaust gas conduit.

In any of the aspects or embodiments described above and herein, the plurality of heat transfer features may be configured to provide structural reinforcement.

In any of the aspects or embodiments described above and herein, a plurality of second heat transfer features may extend into a second flow path defined by a respective bypass air passage.

In any of the aspects or embodiments described above and herein, a plurality of flow guidance features may extend into a second flow path defined by a respective bypass air passage, and the flow guidance features may be configured to guide bypass air flow from the inlet air scoop to the outlet air scoop.

In any of the aspects or embodiments described above and herein, the system may include a water recovery system in communication with the exhaust gas condenser, and the water recovery system may be configured to recover liquid water from the exhaust gas condenser.

According to an aspect of the present disclosure, an exhaust gas condenser for an aircraft turbine engine is provided. The exhaust gas condenser extends lengthwise along a central axis and includes a housing, a nozzle, an inlet air scoop, an outlet air scoop, and an exhaust gas conduit bank. The housing extends lengthwise between a forward end and an aft end. The housing has an interior cavity and a plurality of sides that extend between the forward and aft ends. The nozzle is in communication with the housing and is disposed at the aft end. The inlet air scoop is attached to a first side of the plurality of sides of the housing. The outlet air scoop is attached to a second side of the plurality of sides, wherein the second side is opposite the first side. The exhaust gas conduit bank is disposed in the interior cavity of the housing. The exhaust gas conduit bank includes a plurality of exhaust gas conduits and a plurality of bypass air passages, wherein the exhaust gas conduits and the bypass air passages are disposed relative to one another in an alternating configuration. The exhaust gas conduits extend axially between the forward and aft ends. The exhaust gas conduits are open at the forward end to receive the exhaust gases from the turbine engine and are open at the nozzle. The bypass air passages are configured to receive bypass air from the inlet air scoop and direct the bypass air between the exhaust gas conduits, across the condenser to the outlet air scoop.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 5 is a diagrammatic end view of a present disclosure exhaust gas condenser embodiment.

FIG. 6 is a diagrammatic side view of an embodiment of a bank of exhaust gas conduits and bypass air passages.

DETAILED DESCRIPTION

Figure 1:
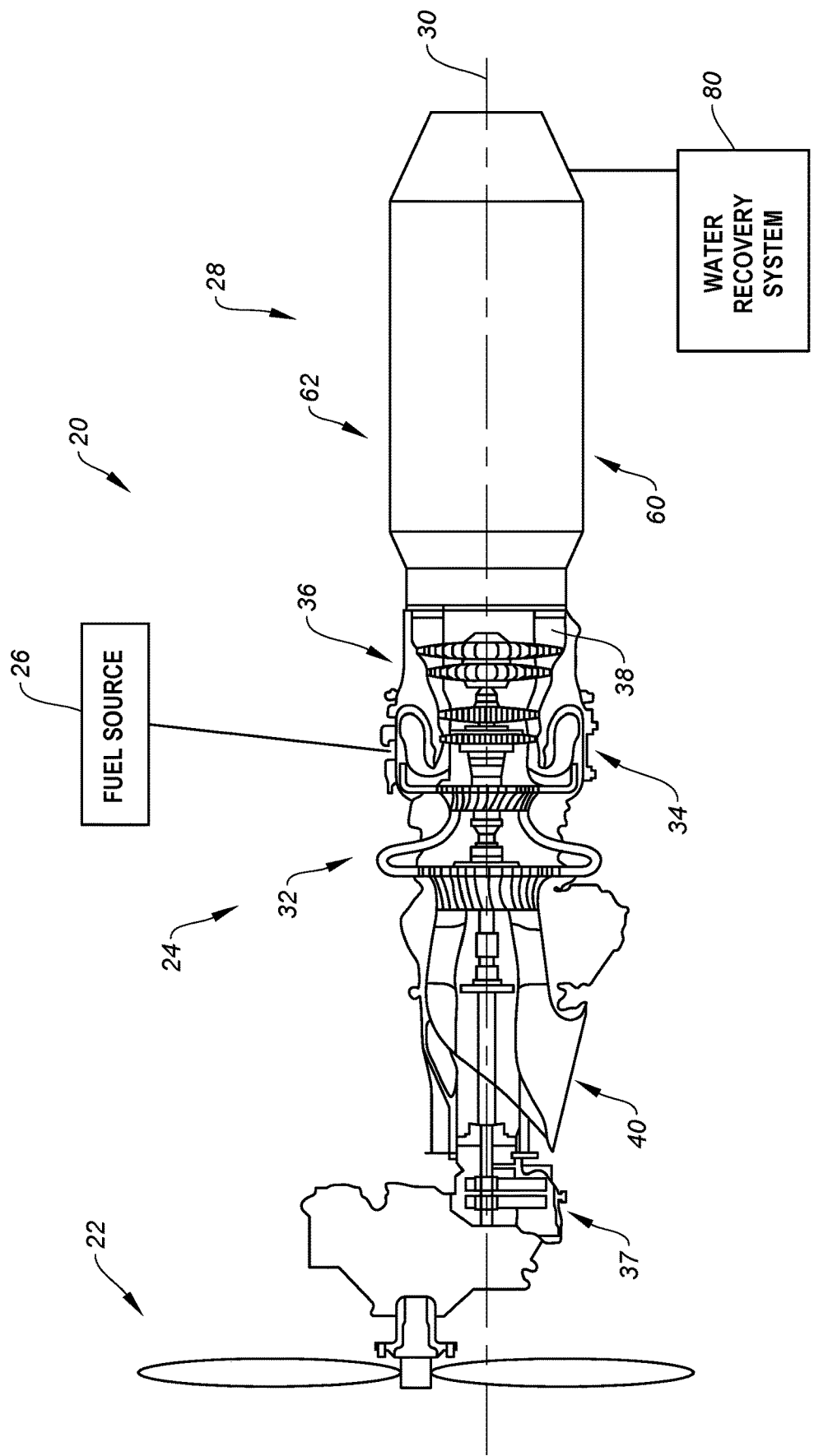
FIG. 1 is a diagrammatic partially sectioned view of a present disclosure propulsion system.

FIG. 1 diagrammatically illustrates a propulsion system 20 for an aircraft. The aircraft may be an airplane, a helicopter, a drone (e.g., an unmanned aerial vehicle (UAV)) or any other manned or unmanned aerial vehicle or system. The propulsion system 20 shown in FIG. 1 includes a propulsor rotor 22, a turbine engine 24, a fuel source 26, and an exhaust gas condenser 28. Non-limiting examples of a propulsor rotor 22 include a propeller rotor for a turboprop propulsion system, a rotorcraft rotor (e.g., a main helicopter rotor) for a turboshaft propulsion system, a propfan rotor for a propfan propulsion system, a pusher fan rotor for a pusher fan propulsion system, a fan for a turbofan propulsion system, or the like. Unless otherwise stated herein, the present disclosure is not limited to any particular turbine engine 24 configuration, or any propulsor rotor 22 configuration.

The turbine engine 24 extends axially along an axis 30 between an upstream, forward end and a downstream, aft end. The turbine engine 24 includes a compressor section 32, a combustor section 34, and a turbine section 36. A reduction gearbox 37 provides drive communication between the engine 24 and the propulsor rotor 22. A core flow path 38 extends sequentially through the compressor section 32, the combustor section 34, and the turbine section 36. Air enters the turbine engine 24 through an airflow inlet 40 upstream of the compressor section 32, passes through the core flow path 38, and exits the turbine engine 24. Thereafter, the core gas enters the exhaust gas condenser 28. As indicated above, the present disclosure is not limited to any particular turbine engine 24 configuration and the aforesaid description of the core flow path 38 and engine component positioning is for illustration purposes and is not intended to be limiting.

Embodiments of the present disclosure propulsion system 20 may include a turbine engine 24 configured to combust non-hydrocarbon fuels (e.g., hydrogen or "$H_2$"), or hydrocarbon fuels (e.g., aviation fuel), or some mixture thereof. For example, the turbine engine 24 within a present disclosure system 20 embodiment may be configured to combust a fuel that is 100% non-hydrocarbon (e.g., 100% $H_2$), or a fuel that is 100% hydrocarbon (e.g., 100% aviation fuel), or a mixture thereof (e.g., a mixture of $H_2$ and aviation fuel). The present disclosure is not limited to any combusting any particular fuel. In those embodiments wherein the present disclosure system 20 combusts hydrogen, the fuel source 26 may be configured to store the hydrogen in liquid form and the present disclosure system 20 may be configured to process the hydrogen to a form (e.g., phase change to a gaseous phase) acceptable for combustion.

The combustion products generated by the combustion of the fuel-air mixture within the combustor section 34 include water ($H_2O$) vapor. The water vapor may be a product of the combustion of a non-hydrocarbon fuel, or the product of water injected into the engine 24 that is vaporized during operation, or any combination thereof. As will be detailed herein, the exhaust gas condenser 28 portion of the present disclosure system 20 is configured to recover at least some of the water vapor produced by the combustion of the fuel-air mixture within the combustor section 34.

Figure 3:
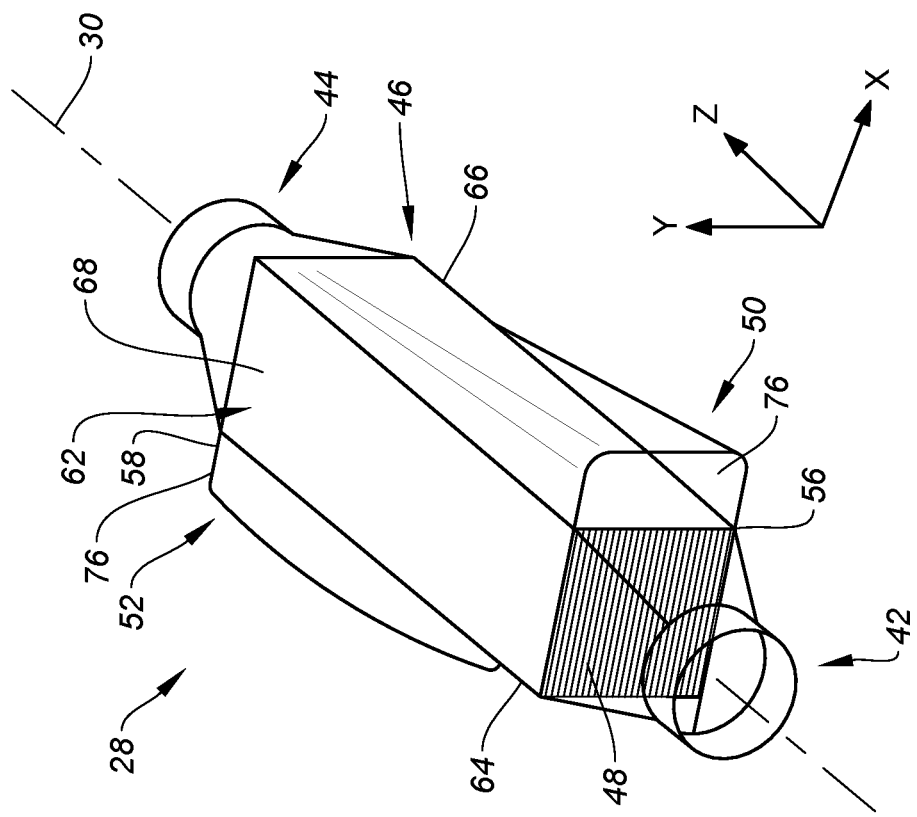
FIG. 3 is a diagrammatic perspective view of a present disclosure exhaust gas condenser embodiment.
Figure 2:
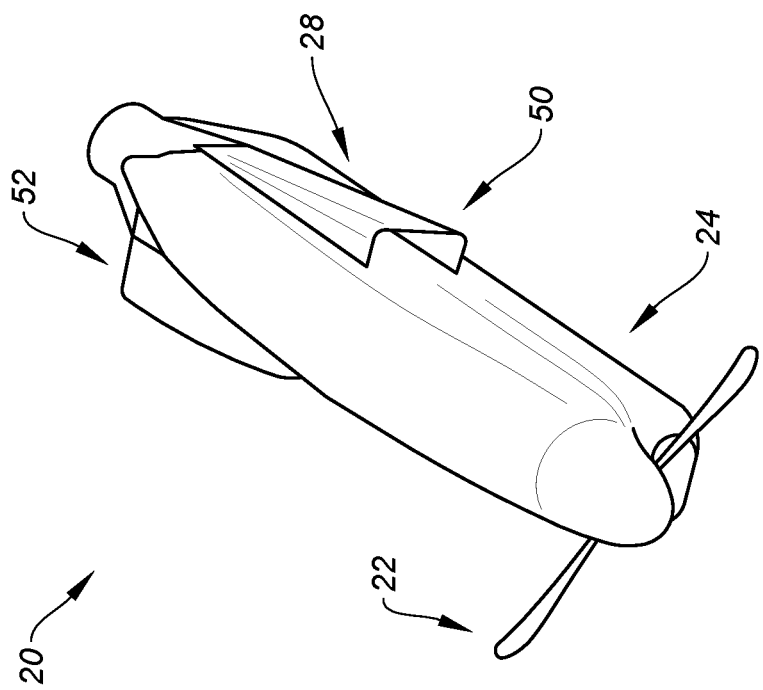
FIG. 2 is a diagrammatic perspective view of a present disclosure propulsion system.
Figure 4:
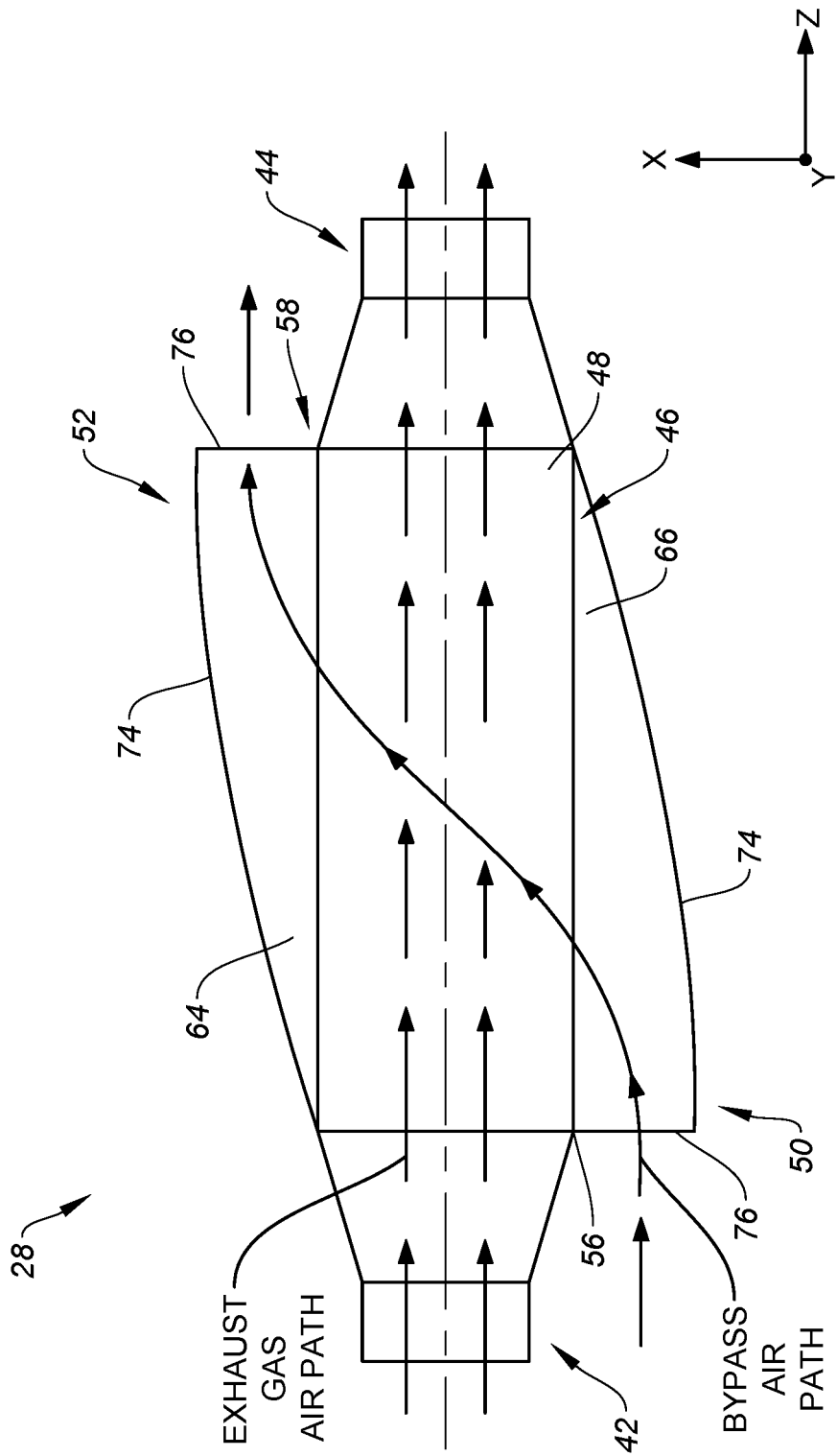
FIG. 4 is a diagrammatic top view of a present disclosure exhaust gas condenser embodiment.

FIG. 2 diagrammatically illustrates a present disclosure aircraft propulsion system 20 with a turbine engine 24 enclosed within a housing that is disposed forward of an aircraft exhaust gas condenser 28. FIG. 3 is a diagrammatic perspective view of a present disclosure exhaust gas condenser 28. FIG. 4 is a diagrammatic top view of a present disclosure exhaust gas condenser 28. FIG. 5 is a diagrammatic end view of a present disclosure exhaust gas condenser 28, wherein the view is in the direction forward to aft. FIG. 6 is a diagrammatic side view of a present disclosure exhaust gas condenser.

Referring to FIGS. 3-6, the exhaust gas condenser 28 extends along a central axis (e.g., coincident with the engine axis 30) between an exhaust gas inlet 42 and a nozzle 44. The exhaust gas condenser 28 includes a housing 46, a housing interior cavity 48, an inlet air scoop 50, an outlet air scoop 52, and a bank of exhaust gas conduits 54. The exhaust gas inlet 42 is disposed at a forward end 56 of the housing 46 and the nozzle 44 is disposed at an aft end 58 of the housing 46.

In the embodiment shown in FIGS. 3-6, the exhaust gas condenser housing 46 has a generally rectangular configuration having a width (X-axis), a height (Y-axis), and a length (Z-axis). The cross-section geometry of the condenser housing 46 (e.g., in the X-Y plane) is generally square. In this configuration, the condenser housing 46 may be described as having a bottom side 60 and a top side 62 opposite one another, and a first lateral side 64 and a second lateral side 66 opposite one another. The housing interior cavity 48 is defined by the bottom, top, first lateral, and second lateral sides 60, 62, 64, 66. The condenser housing 46 includes a top side panel 68 that extends lengthwise between the forward and aft ends 56, 58, and widthwise between the first and second lateral sides 64, 66. In some embodiments, the condenser housing 46 includes a bottom side panel 70 that extends lengthwise between the forward and aft ends 56, 58, and widthwise between the first and second lateral sides 64, 66. In some embodiments, the condenser housing 46 may include lateral side panels (not shown) that allow bypass air passage therethrough (e.g., via one or more apertures) and that provide structural support. The condenser housing 46 does not require lateral side panels.

In the embodiment shown in FIGS. 3-6, the inlet and outlet air scoops 50, 52 each extend lengthwise for substantially the entire length of the condenser housing 46. The outlet air scoop 52 is disposed on the first lateral side 64 of the condenser housing 46 and the inlet air scoop 50 is disposed on the second lateral side 66 of the condenser housing 46. FIGS. 3-6 show the inlet and outlet air scoops 50, 52 each having a generally rectangular cross-sectional configuration, defined by a pair of side panels 72 and an outer panel 74. The present disclosure is not limited to air scoops with a rectangular configuration; e.g., the air scoops 50, 52 may be arcuately shaped. The inlet and outlet air scoops 50, 52 each include an opening 76. The opening 76 of the inlet air scoop 50 may be disposed proximate to the forward end 56 of the condenser housing 46, and the opening 76 of the outlet air scoop 52 may be disposed proximate to the aft end 58 of the condenser housing 46. Each respective opening 76 may be defined by a respective plane that extends between the condenser housing 46 (e.g., a lateral side of the housing 46) and the outer panel and sides 74, 72 of the respective air scoop 50, 52; e.g., the opening 76 planes are disposed in the X-Y plane. The present disclosure is not limited to the aforesaid scoop opening 76 orientation. The outlet air scoop 52 tapers outwardly away from the central axis 30 of the condenser 28 in the direction from forward to aft, and the inlet air scoop 50 tapers inwardly toward the central axis 30 of the condenser 28 in the direction from forward to aft. In this manner, the cross-sectional flow area of the outlet air scoop 52 increases in the direction from forward to aft, and the cross-sectional flow area of the inlet air scoop 50 decreases in the direction from forward to aft. In the embodiment shown in FIGS. 3-6, the outer panel 74 of the respective air scoops 50, 52 are shown extending arcuately. Alternatively, the outer panel 74 of the respective air scoops 50, 52 may extend linearly. As stated above, in the embodiment shown in FIGS. 3-6 the inlet and outlet air scoops 50, 52 each extend lengthwise for substantially the entire length of the condenser housing 46 and are shown enclosing the entire respective side of the condenser housing 46. The present disclosure is not limited to this embodiment. For example, one or both of the inlet and outlet air scoops 50, 52 may extend lengthwise for less than the entire length of the condenser housing 46 and/or may enclose less that the entire respective side of the condenser housing 46.

The bank of exhaust gas conduits 54 is disposed within the housing interior cavity 48. The bank of exhaust gas conduits 54 includes a plurality of planar exhaust gas conduits 54 that extend axially (e.g., along the Z-axis) between the forward and aft ends 56, 58 of the condenser housing 46, and laterally within the condenser housing 46 between the housing lateral sides 64, 66. The exhaust gas conduits 54 are open at the forward end 56 to receive turbine engine exhaust gas. At the aft end 58, the exhaust gas conduits 54 are in fluid communication with a manifold 78 that directs the exhaust gas to the nozzle 44. As will be detailed herein, the manifold 78 is in communication with a water recovery system 80.

The exhaust gas conduits 54 are spaced apart from one another such that a passage (e.g., a "bypass air passage 82") is disposed between each adjacent pair of exhaust gas conduits 54. The exhaust gas conduits 54 are closed and thereby provide an enclosed passage for exhaust gas axially between the forward and aft ends 56, 58 of the condenser housing 46. As will be detailed herein, the closed exhaust gas conduits 54 keep the exhaust gas separate (i.e., fluidly isolated from) from bypass air traveling through the bypass air passages 82 disposed between adjacent exhaust gas conduits 54. FIG. 5 is a diagrammatic end view showing the alternating exhaust gas conduits 54 and bypass air passages 82. FIG. 6 is a diagrammatic side view showing the exhaust gas conduits 54 and the bypass air passages 82 extending axially, alternatingly disposed relative to one another.

The present disclosure is described herein as having an exhaust gas condenser 28 that includes exhaust gas conduits 54 and bypass air passages 82. In alternative embodiments, the present disclosure may include bypass air conduits and exhaust gas passages disposed in the alternating manner described herein.

Figure 7:
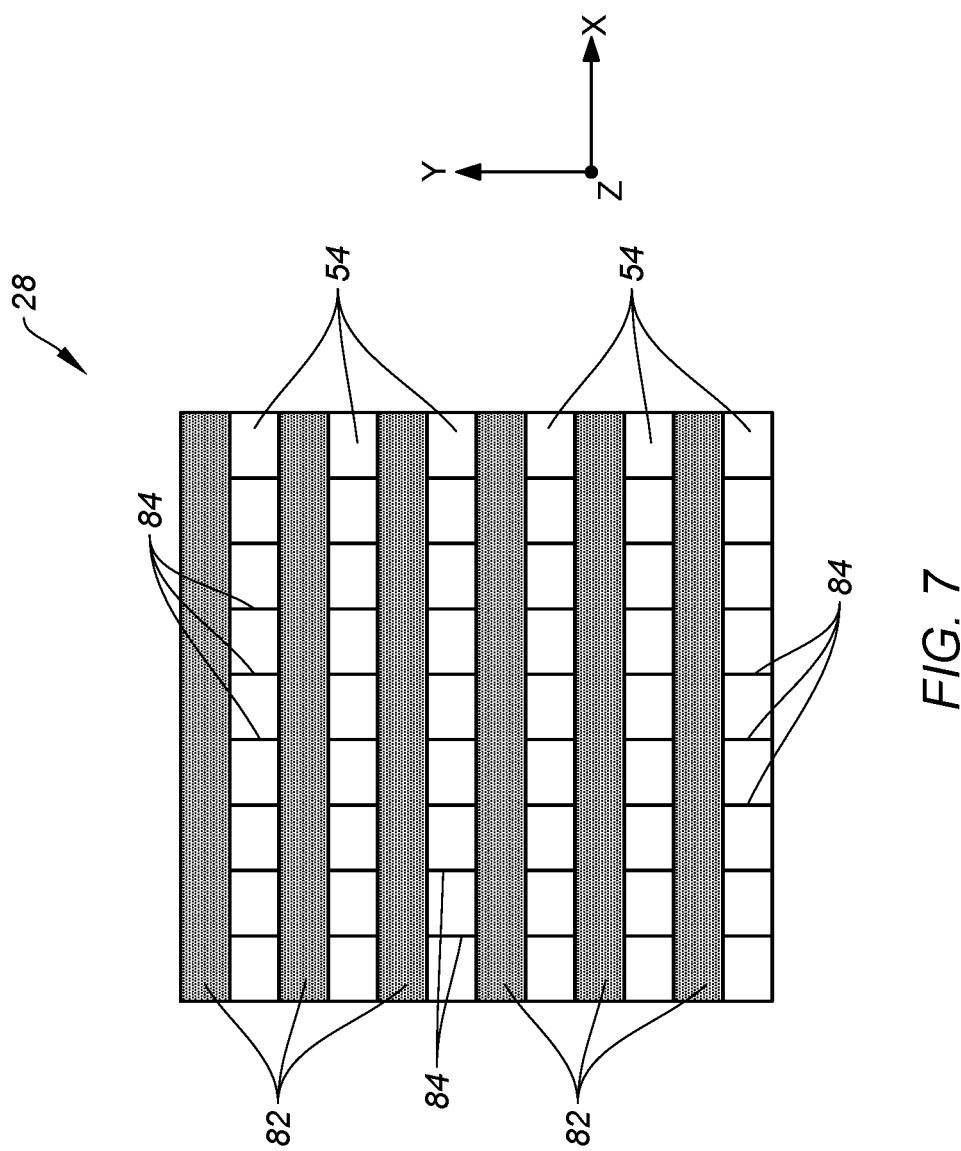
FIG. 7 is a diagrammatic end view of a present disclosure exhaust gas condenser embodiment.
Figure 8:
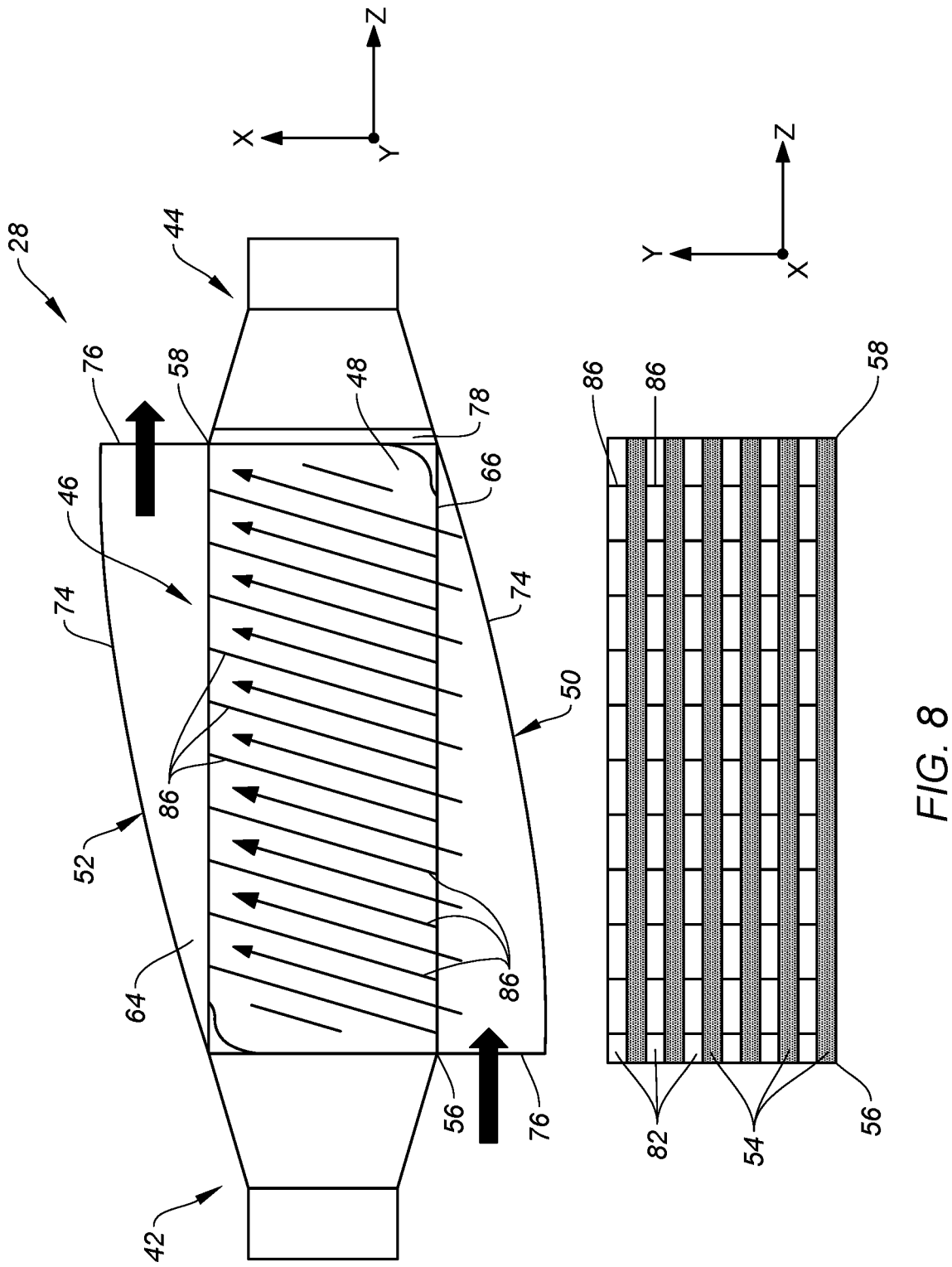
FIG. 8 is a diagrammatic top view and side view of an embodiment of a bank of exhaust gas conduits and bypass air passages.

Referring to FIGS. 7 and 8, in some embodiments one or more of the exhaust gas conduits 54 may include features 84 (e.g., fins, pins, ribs, and the like) that extend into the respective exhaust gas conduit 54 (i.e., into the flow path defined by the exhaust gas conduit 54). The features 84 may be configured to increase heat transfer. In some embodiments, one or more of the exhaust gas conduits 54 may include features 84 that provide structural reinforcement to the exhaust gas conduit. FIG. 7 diagrammatically illustrates an end view wherein each of the exhaust gas conduits 54 includes a plurality of ribs 84 that extend across the respective exhaust gas conduit 54 (i.e., across the flow path defined by the exhaust gas conduit 54) to act as heat transfer surfaces and structural members. The aforesaid ribs 84 are shown as a nonlimiting example of a feature that increases heat transfer and/or provides structural reinforcement. The features 84 need not extend across the respective exhaust gas conduit 54, and may alternatively extend a limited distance into an exhaust gas conduit 54. The present disclosure is not limited to this example. In similar fashion, features 86 may extend into flow path defined by a respective bypass air passage 82, which feature 86 facilitates heat transfer and/or provides structural reinforcement. In some embodiments, these features 86 may be configured to function as air guide members, guiding the bypass air laterally across the bank of exhaust gas conduits 54 between the inlet air scoop 50 and the outlet air scoop 52. FIG. 8 diagrammatically illustrates a top view and a side view wherein in each of the bypass air passages 82 a plurality of ribs 86 extend across the respective bypass air passage 82. The aforesaid ribs 86 are shown as a nonlimiting example of a feature and the present disclosure is not limited to this example.

As stated above, the combustion products generated by the combustion of the fuel-air mixture within the combustor section 34 of the turbine engine may include water ($H_2O$) vapor and/or water vapor may be present as a result of water injection. The exhaust gas condenser 28 is configured to utilize bypass air to cool the exhaust gas to a degree that causes at least some of the water vapor in the exhaust gas to change from a gaseous phase to a liquid phase. The liquid water is subsequently recovered and may be used for a variety of different purposes, including injection into turbine engine sections including the compressor section 32, the combustor section 34, and the turbine section 36, and/or for use in the aircraft cabin. Various uses for water (in liquid or gaseous form) in a turbine engine or an aircraft are known in the art, and the present disclosure is not limited to any particular one thereof.

During operation of the present disclosure aircraft propulsion system, the turbine engine 24 is operated to combust a fuel/air mixture to produce power. The produced exhaust gases exit the turbine section 36 and are directed into the exhaust gas inlet 42 of the exhaust gas condenser 28. The exhaust gas is subsequently received within the exhaust gas conduits 54. The exhaust gas travels axially through the exhaust gas conduits 54 and subsequently enters the manifold 78 disposed at the aft end 58 of the condenser housing 46.

While the aircraft is underway, the ambient air is captured by the inlet air scoop 50 and is directed into the condenser 28. More specifically, the captured air (which may be categorized as "ram air" when the aircraft is underway) is directed inwardly by the tapered inlet air scoop 50 and into the bypass air passages 82. The ambient air travels laterally across the bank of exhaust gas conduits 54 via the bypass air passages 82. The temperature of the ambient air is appreciably lower than the temperature of the exhaust gases and acts as a cooling medium within the condenser 28. The bypass air cools the exhaust gas conduits 54 prior to exiting the condenser housing 46 and the cooled exhaust gas conduits 54, in turn, causes the exhaust gas conduits 54 to cool the exhaust gases traveling axially therethrough. The exhaust gases are cooled sufficiently to cause at least some of the water vapor in the exhaust gases to change from a gaseous phase to a liquid phase.

After the bypass air has passed through the bypass air passages 82, the bypass air enters and exits the outlet air scoop 52. In some embodiments, the outlet air scoop 52 may be configured to disperse the bypass air in a manner that does not produce any propulsive thrust. In some embodiments, the outlet air scoop 52 may be configured to disperse the bypass air in a manner that produces propulsive thrust for a least a portion of the flight operation.

The exhaust gases entering the manifold 78 disposed at the aft end 58 of the condenser housing 46 may include some amount of liquid water as a result of the cooling. The manifold 78 may be in communication with a water recovery system 80 (e.g., that may include a pump, filters, valves, and the like) that directs the recovered water for use elsewhere as detailed herein.

The present disclosure aircraft propulsion system described herein having an exhaust gas condenser 28 with an inlet air scoop 50 and an outlet air scoop 52 is configured for convenient placement under the wing of an aircraft.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc. The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An aircraft propulsion system, comprising:
   a turbine engine configured to exhaust gases during combustion; and
   an exhaust gas condenser that extends lengthwise along a central axis, the exhaust gas condenser including:

a housing extending lengthwise between a forward end and an aft end, the housing having an interior cavity, a top side, a bottom side opposite the top side, a first lateral side, and a second lateral side opposite the first lateral side, wherein the first lateral side and the second lateral side both extend between the top side and the bottom side;

a nozzle in communication with the housing and disposed at the aft end;

an inlet air scoop attached to the second lateral side of the housing and open to ambient air;

an outlet air scoop attached to the first lateral side of the housing; and an exhaust gas conduit bank disposed in the interior cavity of the housing, wherein the exhaust gas conduit bank includes a plurality of exhaust gas conduits and a plurality of bypass air passages, wherein the exhaust gas conduits and the bypass air passages are disposed relative to one another in an alternating configuration;

wherein the exhaust gas conduits extend axially between the forward end and the aft end, and the exhaust gas conduits are open at the forward end to receive the exhaust gases from the turbine engine and open at the nozzle; and wherein the bypass air passages are configured to receive bypass air from the inlet air scoop and direct the bypass air between the exhaust gas conduits, laterally across the condenser to the outlet air scoop.

2. The aircraft propulsion system of claim 1, wherein the exhaust gas condenser is configured to keep the exhaust gases separate from the bypass air.

3. The aircraft propulsion system of claim 1, wherein the housing has a length, a width, and a height; and wherein the inlet air scoop has an opening disposed proximate to the forward end, and the inlet air scoop tapers inwardly toward the central axis in a direction from the forward end to the aft end.

4. The aircraft propulsion system of claim 3, wherein the inlet air scoop extends the length of the housing.

5. The aircraft propulsion system of claim 4, wherein the inlet air scoop extends the height of the housing.

6. The aircraft propulsion system of claim 1, wherein the inlet air scoop has a flow area that decreases in a direction from the forward end to the aft end.

7. The aircraft propulsion system of claim 1, wherein the housing has a length, a width, and a height; and wherein the outlet air scoop has an opening disposed proximate to the aft end, and the outlet air scoop tapers outwardly away from the central axis in a direction from the forward end to the aft end.

8. The aircraft propulsion system of claim 7, wherein the outlet air scoop extends the length of the housing.

9. The aircraft propulsion system of claim 8, wherein the outlet air scoop extends the height of the housing.

10. The aircraft propulsion system of claim 1, wherein the outlet air scoop has a flow area that increases in a direction from the forward end to the aft end.

11. The aircraft propulsion system of claim 1, wherein one or more of the exhaust gas conduits include a plurality of first heat transfer features that extend into a first flow path defined by the respective exhaust gas conduit.

12. The aircraft propulsion system of claim 11, wherein the plurality of heat transfer features are configured to provide structural reinforcement.

13. The aircraft propulsion system of claim 11, wherein a plurality of second heat transfer features extend into a second flow path defined by a respective bypass air passage.

14. The aircraft propulsion system of claim 11, wherein a plurality of flow guidance features extend into a second flow path defined by a respective bypass air passage, the flow guidance features configured to guide bypass air flow from the inlet air scoop to the outlet air scoop.

15. The aircraft propulsion system of claim 1, wherein a plurality of flow guidance features extend into a flow path defined by a respective bypass air passage, the flow guidance features configured to guide bypass air flow from the inlet air scoop to the outlet air scoop.

16. The aircraft propulsion system of claim 1, further comprising a water recovery system in communication with the exhaust gas condenser, the water recovery system configured to recover liquid water from the exhaust gas condenser.

17. An exhaust gas condenser for an aircraft turbine engine, the exhaust gas condenser extending lengthwise along a central axis, comprising:

a housing extending lengthwise between a forward end and an aft end, the housing having an interior cavity, a plurality of sides extending between the forward end and the aft end;

a nozzle in communication with the housing and disposed at the aft end;

an inlet air scoop attached to a first side of the plurality of sides of the housing and open to ambient air;

an outlet air scoop attached to a second side of the plurality of sides, wherein the second side is opposite the first side; and an exhaust gas conduit bank disposed in the interior cavity of the housing, wherein the exhaust gas conduit bank includes a plurality of exhaust gas conduits and a plurality of bypass air passages, wherein the exhaust gas conduits and the bypass air passages are disposed relative to one another in an alternating configuration;

wherein the exhaust gas conduits extend axially between the forward end and the aft end, and the exhaust gas conduits are open at the forward end to receive the exhaust gases from the turbine engine and open at the nozzle; and wherein the bypass air passages are configured to receive bypass air from the inlet air scoop and direct the bypass air between the exhaust gas conduits, across the condenser to the outlet air scoop.

18. The exhaust gas condenser of claim 17, wherein the exhaust gas condenser is configured to keep the exhaust gases separate from the bypass air; and wherein the inlet air scoop has an opening disposed proximate to the forward end, and the inlet air scoop tapers inwardly toward the central axis in a direction from the forward end to the aft end; and wherein the outlet air scoop has an opening disposed proximate to the aft end, and the outlet air scoop tapers outwardly away from the central axis in a direction from the forward end to the aft end.

19. The exhaust gas condenser of claim 18, wherein one or more of the exhaust gas conduits include a plurality of first heat transfer features that extend into a first flow path defined by the respective exhaust gas conduit; and wherein a plurality of second heat transfer features extend into a second flow path defined by a respective bypass air passage.

20. The exhaust gas condenser of claim 17, wherein a plurality of flow guidance features extend into a flow path defined by a respective bypass air passage, the flow guidance features configured to guide bypass air flow from the inlet air scoop to the outlet air scoop.

\* \* \* \* \*